June 25, 1929.

G. A. BURNHAM 1,718,809

ELECTRIC SWITCH

Filed July 3, 1922

Inventor,
George A. Burnham

June 25, 1929.　　G. A. BURNHAM　　1,718,809

ELECTRIC SWITCH

Filed July 3, 1922　　2 Sheets-Sheet 2

Inventor,
George A. Burnham
by
[signature]
atty

Patented June 25, 1929.

1,718,809

UNITED STATES PATENT OFFICE.

GEORGE A. BURNHAM, OF SAUGUS, MASSACHUSETTS, ASSIGNOR, BY MESNE ASSIGNMENTS, TO CONDIT ELECTRICAL MANUFACTURING CORPORATION, OF BOSTON, MASSACHUSETTS, A CORPORATION OF MASSACHUSETTS.

ELECTRIC SWITCH.

Application filed July 3, 1922. Serial No. 572,528.

This invention relates to electric switches especially adapted to control electric motors and has for an object the combination of a motor control switch and means to make known the operative condition of the motor, and give warning of an overloaded condition thereof. The warning means may include a thermally influenced member adapted to be heated by the current in the motor circuit and move to indicate, either directly or through some suitable visual or audible device, the loading of the motor and, particularly, the overloading of the motor. The warning means may also include a device adapted to remain set, until manually restored, to indicate the maximum loading of the motor in the interval succeeding the last restoration of the device.

A further object is generally to improve the construction and operation of electric switches.

While the invention is specially applicable to the control and protection of electric motors, it is not necessarily limited to such use and may also be applied to the control and protection of other electrical apparatus.

Figure 1:
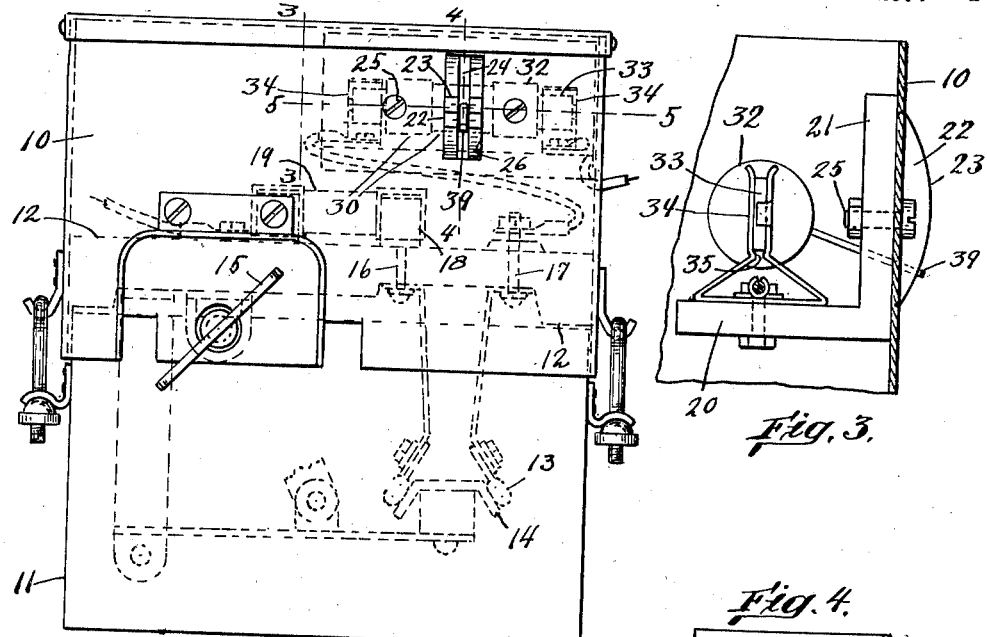
Fig. 1 is a front elevation of an electric switch embodying the invention.
Figure 3:
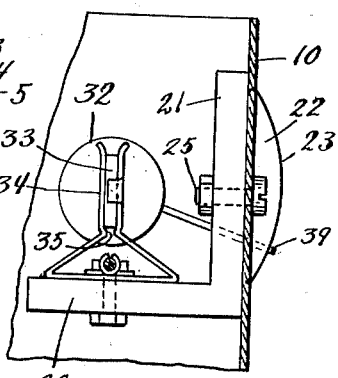
Fig. 3 is a detailed sectional elevation along line 3—3 of Fig. 1 and illustrating more particularly the motor load-warning device.
Figure 4:
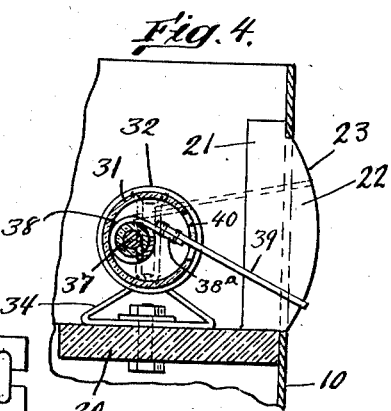
Fig. 4 is a view similar to Fig. 3 taken along line 4—4 of Fig. 1.
Figure 2:
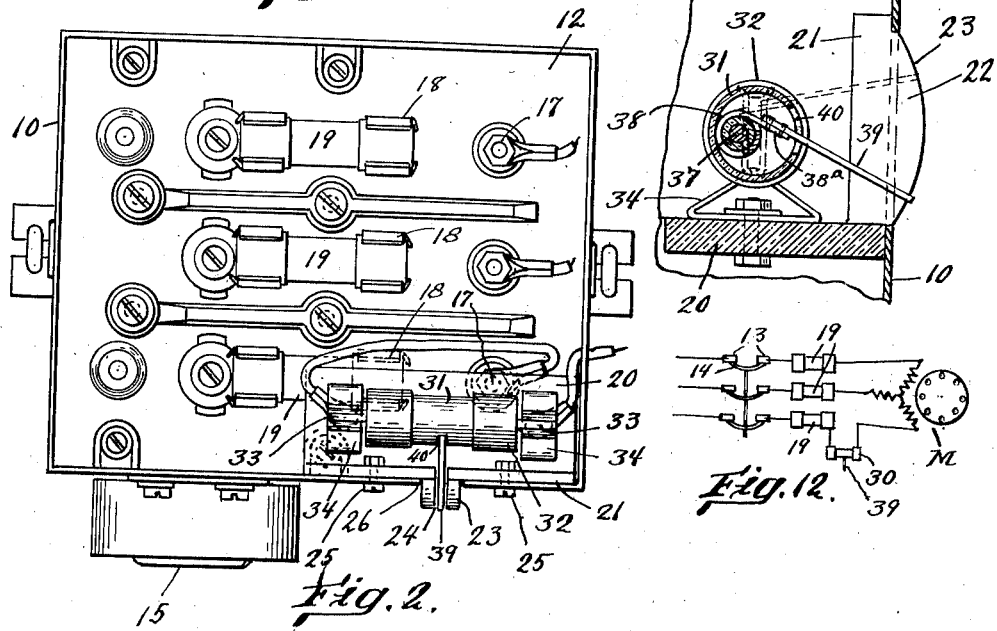
Fig. 2 is a plan view of the switch of Fig. 1 with the cover removed.

As here shown, the switch embodying the invention may include the top casing portion 10 and the bottom casing portion 11 which serves as a receptacle adapted to contain oil in which the switch members are immersed. A base plate 12 of suitable insulating material, as porcelain, is or may be received in and secured to the upper casing portion and suitable stationary and movable switch members 13 and 14 are or may be carried by and depend from the lower face of said plate into the oil in said oil receptacle.

Suitable switch operating mechanism may be contained within the casing and an operating handle 15 may be disposed externally of the casing, by which the switch may be opened and closed.

Switch terminals 16 and 17 may extend above said insulating supporting plate 12 and fuse clips 18 may be connected with certain of said switch terminals as the terminals 16, and are adapted to receive the fuses 19 whereby to provide fused protection to the motor, and other terminals, as the terminals 17 are adapted to be connected to the motor M, here shown as a three-phase induction motor although it may well be any other type of motor, or other electrical apparatus.

The switch herein described is adapted to illustrate in general any switch with which my invention may be associated.

The overload warning means comprising a feature of the invention may include a bracket 20, which may well be formed of insulating material and may have the vertical extension 21 which includes the lateral projecting member 22 formed, preferably, with an arcuate face 23 and a vertically extended slot 24. Said bracket is adapted to be secured within the upper casing portion 10 of the switch and preferably above the insulating plate 12 therein and to a wall of said casing by suitable means, as the bolts 25. Said wall of the casing is or may be formed with a vertically elongated slot 26 therein through which the projecting member 22 of said bracket is extended, whereby the arcuate face of said projecting member is in a position to be visible externally of the switch.

Figure 12:
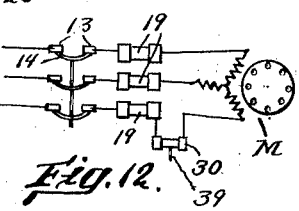
Fig. 12 is a diagram of connection between the switch and the motor.
Figure 5:
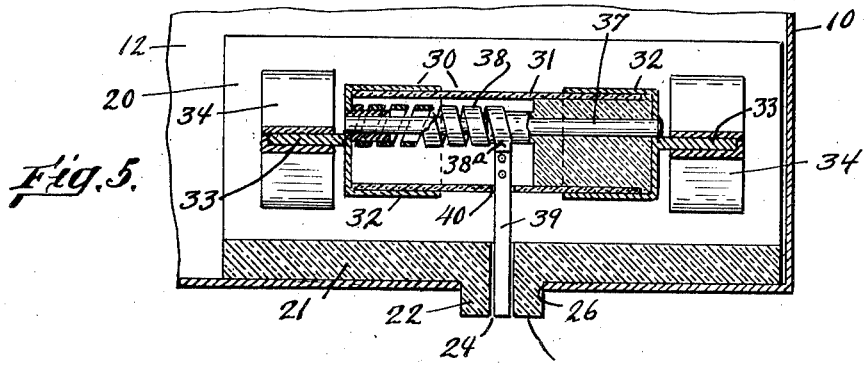
Fig. 5 is a plan sectional detail through the warning device of Fig. 1 along line 5—5 of Fig. 1.
Figure 6:
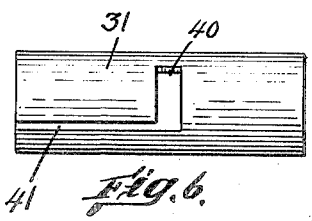
Fig. 6 is a detail of the insulating enclosing casing of the warning device of Fig. 5.

Said warning device includes a current-responsive member 30 which is adapted to be placed in series with the motor M and the switch, as the switch terminal 17 and a motor terminal, see Fig. 12. Said current-responsive member may comprise the tubular enclosing casing 31 formed preferably of insulating material, as fibre. End caps 32 are received on the ends of said casing, and said end-caps may be provided with knife-blade terminals 33 adapted to be received removably in suitable fixed terminals 34 secured to the bracket 20. Preferably, said fixed terminals 34 are formed with suitable stop-members, as the ledges 35, whereby to fix the vertical position of the knife-blade terminals, and consequently, the current-responsive member therein.

Said current-responsive member is formed with the electrical resistance and heating element disposed therein, and said element may comprise a rod 37 of suitable conducting material extended through the enclosing casing and secured in electrical connection with the said end caps 32. A thermally-influenced member is adapted to be influenced by the heat of said rod 37 to indicate the current passing through said heating element, and consequently the loading of the motor. Said thermally-influenced member may comprise the tubular member 38 formed of a plurality of convolutions of thermostatic metal, or other material adapted to expand under heat and move angularly about the central axis of the tubular member. Said tubular member may be disposed about and in heat-receiving relation with the heating rod 37 and the outer end of said member may be held fixed in position, as by being secured to one of said end caps 32. The free end 38ª of said tubular member is or may be disposed in the middle part of the tubular enclosing casing and is free to rotate angularly under the influence of heat, and the extent of angular rotation is or may be proportional to the current passed through said heating rod 37, and consequently proportional to the loading of the motor. A light vane or pointer 39 preferably formed of insulating material, is fixed to and forms an extension of the free end 38ª of said expansible member 38 and extends through an aperture 40 in the tubular enclosing casing. For purposes of assembly a slot 41 extends from an end of said casing into said aperture 40 to permit the insertion of the expansible member with the attached pointer in place in the casing.

Said thermally-influenced device is adapted to be received in the fixed terminals 34 carried by the bracket 20 with the pointer 39 received in the slot 24 of the bracket, and the length of said pointer is such that it is about flush with or protrudes somewhat above the exposed arcuate face of said bracket.

When no current is flowing through the switch and the motor, the pointer is adapted to be at the lower end of the arcuate face. When a normal current is flowing through the switch and the motor, the expansible member of said device is adapted to become heated to a moderate degree and expand and move the pointer 39 upward to position it, say, into the middle of the arcuate face. If the motor becomes overloaded, the pointer will be moved to the upper part of the arcuate face, and its position serves to indicate such overloaded condition of the motor.

The thermally-influenced member herein described is substantially as shown in a copending application of George W. O'Keeffe, Serial No. 557,054, filed April 25, 1922, now Patent No. 1,574,508, issued February 23, 1926.

Figure 7:
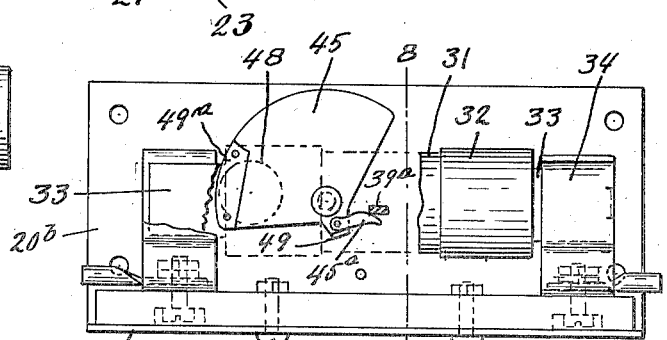
Fig. 7 is a rear elevation, partly broken away, of a modified form of warning device.
Figure 8:
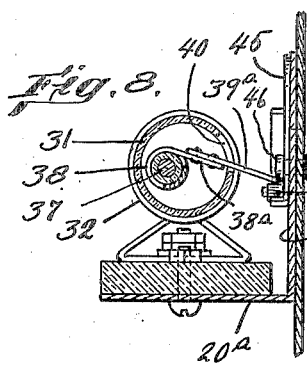
Fig. 8 is a transverse section along line 8—8 of Fig. 7.

In the modification illustrated in Fig. 7 et seq., the thermally-influenced member is adapted to actuate a target to indicate the loading of the motor.

Figures 9, 10:
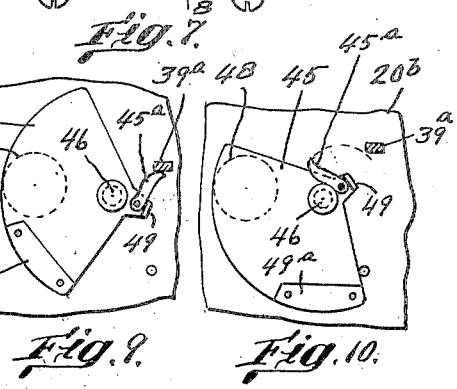
Fig. 9 is a detail of the indicating sector of Fig. 7 in position to be tripped to indicate a dangerous motor overload.
Fig. 10 is a view similar to Fig. 9 with the sector tripped and moved to a warning position.
Figure 11:
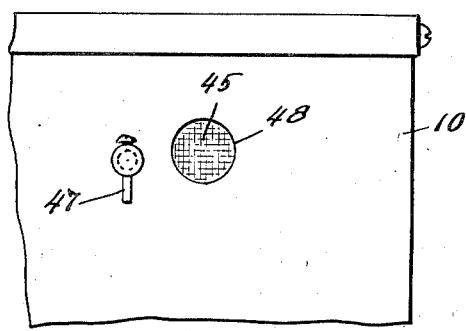
Fig. 11 is a detailed front view of the switch and illustrating more particularly the window in the switch through which the warning sector is visible.

In this modification, the thermally influenced member may be carried by a bracket 20ª disposed within the switch casing. The target may comprise the sector 45 fixed to the pin 46 which latter may be pivotally received in the vertical member 20ᵇ of the bracket and extend outwardly through the wall of the switch casing. A handle 47 may be secured to the extended end of said pin to permit manual restoration of the target after it has been moved to its extreme position. Said sector is movable over an aperture or window 48 in the switch casing and an aligned aperture in the bracket to present different portions thereof for inspection through said aperture, and said different portions may bear suitable indicia, as for instance, they may be variously colored, to indicate the loading of the motor. Said sector may have a latch 45ª pivoted thereto and said latch may be free to move about its pivot in one direction but may be restrained from movement in the opposite direction by engagement with a suitable stop-member as the projection 49 carried by said sector. Said sector may be normally overbalanced, as by the weight 49ª, whereby to tend to move downward to expose the upper portion of it through the aperture in the switch casing and such movement may be controlled by the pointer 39ª of the thermally-influenced member, and said pointer is or may be arranged to engage the latch 45ª of said sector. When no current is flowing through the switch and motor, the pointer 39ª is in its low position and holds the sector in its raised position, as illustrated in Fig. 7, against the action of the weight 49ª. When a normal current is flowing through the motor circuit, the thermally influenced member is actuated to raise the pointer to some intermediate position, and the sector 45 follows the movement of the pointer. When an excessive current flows through the motor circuit, or the motor is overloaded, the pointer 38ª is raised to a sufficient degree to permit the latch 45ª to pass from beneath the pointer and permit the sector to fall by its weight into a position indicated in Fig. 10 and to expose the upper portion thereof through the aperture in the switch casing and thereby indicate visually the overloaded condition of the motor. The sector will remain in such position until it is restored, although the pointer 38ª subsequently may descend to its low position and the sector may be restored by rotation of the handles 47 connected with the sector to replace the latch 45ª again in engagement with the underside of said pointer 38ª.

The visual portion of said sector may bear suitable indicia to indicate the corresponding load conditions of the motor. For instance, the lower portion of the sector may be white and, when exposed to view, may indicate that the motor is operating under less than full load. The upper portion of the sector may be red in color and, when exposed, may indicate an overloaded and dangerous condition of the motor. The arrangement of the device is such that, when the motor is dangerously overloaded, the sector is adapted to be tripped to expose its warning signal until it is reset, even though normal current conditions are restored before the sector is reset.

Instead of actuating a visual signal, the thermally-influenced member may actuate an audible signal in an obvious manner.

The construction herein set forth may be modified without departing from the spirit of the invention.

I claim:

1. The combination of a switch, overload responsive means, and an enclosing casing common to said switch and overload responsive means, said casing having an opening, and said overload responsive means comprising a thermo-responsive device and an indicator actuated thereby, said indicator being visible through said opening in the casing for indicating the load condition of the circuit including said switch when the latter is closed.

2. The combination of an electric apparatus having a casing and load responsive means including a movable member disposed within said casing in circuit with said apparatus, a gravity-influenced pivoted target visual through an aperture in said casing and bearing load-condition indicia thereon, and a latch carried by said target disengageably connected with said movable member, said movable member permitting said target to move to indicate load conditions from substantially no load to substantially full load and, upon suitable movement of said movable member, to release said latch to permit said target to drop to thereby indicate overload until said target is reset.

3. The combination of an electric apparatus having a casing and thermally-influenced means including a movable member disposed within said casing in circuit with said apparatus, a gravity-influenced pivoted target visual through an aperture in said casing and bearing load-condition indicia thereon, and a latch carried by said target disengageably connected with said movable member, said movable member permitting said target to move to indicate load conditions from substantially no load to substantially full load and, upon suitable movement of said movable member, to release said latch to permit said target to drop to thereby indicate overload until said target is reset.

4. A load indicating device comprising load-responsive means including a movable member, a gravity-influenced target, and a latch carried by said target disengageably connected with said movable member, said movable member permitting said target to move to indicate load conditions from substantially no load to substantially full load and, upon suitable movement of movable member to release said latch to permit said target to drop to thereby indicate overload until said target is reset.

In testimony whereof, I have signed my name to this specification.

GEORGE A. BURNHAM.